United States Patent [19]

Grabowski et al.

[11] Patent Number: 6,093,222
[45] Date of Patent: Jul. 25, 2000

[54] DIESEL FUEL ANTIFOAM COMPOSITION

[75] Inventors: Wojciech Grabowski, Gland; Rolf Haubrichs, Geneva, both of Switzerland

[73] Assignee: CK Witco Corporation, Greenwich, Conn.

[21] Appl. No.: 09/211,901

[22] Filed: Dec. 15, 1998

Related U.S. Application Data

[63] Continuation-in-part of application No. 08/829,969, Apr. 3, 1997, Pat. No. 6,001,140.

[60] Provisional application No. 60/014,836, Apr. 4, 1996.

[51] Int. Cl.[7] ........................................................ C10L 1/28
[52] U.S. Cl. ........................... 44/320; 252/321; 252/358; 528/10; 528/25; 528/29
[58] Field of Search ................... 252/321, 358; 528/25, 29, 10; 44/320

[56] References Cited

U.S. PATENT DOCUMENTS

| | | | |
|---|---|---|---|
| 3,233,986 | 2/1966 | Morehouse | 44/320 |
| 3,381,019 | 4/1968 | Morehouse | 260/340.9 |
| 3,384,599 | 5/1968 | Omietanski et al. | 252/352 |
| 3,507,815 | 4/1970 | Bailey | 260/25 |
| 3,794,673 | 2/1974 | Boersma et al. | 556/445 |
| 4,417,068 | 11/1983 | Kollmeier et al. | 556/479 |
| 4,431,789 | 2/1984 | Okazaki et al. | 528/15 |
| 4,690,688 | 9/1987 | Adams et al. | 44/320 |
| 4,854,938 | 8/1989 | Easton et al. | 44/320 |
| 4,996,277 | 2/1991 | Bradshaw et al. | 528/15 |
| 5,001,248 | 3/1991 | Grabowski | 556/458 |
| 5,070,112 | 12/1991 | Grabowski | 521/112 |
| 5,145,879 | 9/1992 | Budnik et al. | 521/112 |
| 5,231,157 | 7/1993 | Herzig et al. | 528/15 |
| 5,262,155 | 11/1993 | Vincent et al. | 424/78.02 |
| 5,306,341 | 4/1994 | Ono et al. | 106/287.13 |
| 5,397,367 | 3/1995 | Fey et al. | 44/320 |
| 5,417,867 | 5/1995 | Mikami et al. | 528/10 |
| 5,424,384 | 6/1995 | Gentle et al. | 528/12 |
| 5,428,142 | 6/1995 | O'Lenick, Jr. | 536/1.11 |
| 5,435,811 | 7/1995 | Fey et al. | 44/320 |
| 5,446,119 | 8/1995 | Herzig et al. | 528/26 |
| 5,474,709 | 12/1995 | Herzig et al. | 252/321 |
| 5,482,775 | 1/1996 | Miyabayashi | 428/391 |
| 5,486,565 | 1/1996 | Gentle et al. | 524/730 |
| 5,525,640 | 6/1996 | Gerkin et al. | 521/112 |
| 5,542,960 | 8/1996 | Grabowski | 44/320 |
| 5,613,988 | 3/1997 | Spiegler et al. | 44/320 |
| 5,620,485 | 4/1997 | Fey | 44/320 |
| 5,639,844 | 6/1997 | Blum et al. | 428/15 |
| 5,654,362 | 8/1997 | Schultz et al. | 524/862 |
| 5,661,202 | 8/1997 | Akamatsu et al. | 524/265 |
| 5,750,643 | 5/1998 | Blum et al. | 528/481 |
| 5,891,977 | 4/1999 | Dietz et al. | 528/15 |

FOREIGN PATENT DOCUMENTS

| | | |
|---|---|---|
| 393509B | 11/1991 | Austria . |
| 0 193 815 | 9/1986 | European Pat. Off. . |
| 0398745 A2 | 5/1990 | European Pat. Off. . |
| 0398745 A3 | 5/1990 | European Pat. Off. . |
| 0475130 A2 | 8/1991 | European Pat. Off. . |
| 0475139 A3 | 8/1991 | European Pat. Off. . |
| 0 662 334 A2 | 7/1995 | European Pat. Off. . |
| 0 741 182 | 11/1996 | European Pat. Off. . |
| 0 741 182 A2 | 11/1996 | European Pat. Off. . |
| 2646672 A1 | 11/1990 | France . |
| 4032006A1 | 4/1992 | Germany . |
| 4306041 A1 | 9/1994 | Germany . |
| 43 18537 A1 | 12/1994 | Germany . |
| 43 18539 A1 | 12/1994 | Germany . |
| 4343235C1 | 12/1994 | Germany . |
| 4325359A1 | 2/1995 | Germany . |
| 707 906 | 4/1954 | United Kingdom . |
| 2 173 510A | 10/1986 | United Kingdom . |
| 2173510A | 10/1986 | United Kingdom . |

OTHER PUBLICATIONS

Patent abstracts of Japan, appln No. 02124369, May 15, 1990.
Derwent WPI Abstract of DE 43 18539, Dec. 1994.
J. Marcromol. Sci. Pure Applied Chemo (1994) A31 (3), 305–18 month unknown.
Polymer (1989) 30(3) 553–7 month unknown.
J. Appl. Polym. Sci. (1995) 55(4)611–19 month unknown.
Abstract of EP 0193815, Sep. 10, 1986.
Abstract of DE 4032 006 A1, Apr. 1992.
Abstract od EP 662334, Jul. 12, 1995.

*Primary Examiner*—Jacqueline V. Howard
*Assistant Examiner*—Cephia D. Toomer
*Attorney, Agent, or Firm*—Vidas, Arrett & Steinkraus, P.A.

[57] ABSTRACT

A defoamer system for diesel fuel which uses a synergistic blend of silicone polymers substituted respectively with polyhydric and polyether groups, or a silicone polymer having a mixture of polyhydric, polyether and phenol substituents thereon. The defoamer system provides low silicone treat rate, and compatibility with additive packages.

19 Claims, No Drawings

DIESEL FUEL ANTIFOAM COMPOSITION

CROSS REFERENCE TO RELATED APPLICATION

This is a continuation-in-part of application Ser. No. 08/829,969 filed Apr. 3, 1997 now U.S. Pat. No. 6,001,140, which claims priority of application 60/014836, filed Apr. 4, 1996.

BACKGROUND OF THE INVENTION

Diesel fuel is a mixture of a variety of hydrocarbons. Most of the hydrocarbons are aliphatic, but aromatics may be present at up to twenty to twenty five weight percent of the fuel. The mixture can also include kerosine or gas oil. Diesel fuel is commonly used in motor vehicles, and has a tendency to foam profusely when it is poured into the fuel tank of a motor vehicle. It is therefore desirable to reduce such foaming, which can be accomplished by the addition of a defoamer.

Oil companies treat diesel fuel with organic additives, such as detergents, cetane improvers, viscosity breakers and occasionally perfumes, frequently as a preblended mixture of additives collectively referred to as a "DAP". Each oil company has its own preferred DAP which it typically uses only for mixing with its own fuel. All of these organic additives must be compatible with the defoamer.

Diesel fuels delivered to filling stations also may contain some amount of dispersed or dissolved water which can adversely affect the performance characteristics of previously known defoamers. The water causes a decay in defoaming characteristics and in some extreme cases, may cause the defoamer to enhance foaming, rather than suppress it. Such wet defoamers also can result in increased sludge deposition in the fuel tank.

Certain silicones are known to defoam diesel fuel. However, the introduction of silicon into engine systems can have adverse effects so there exists a need to provide low silicon content defoaming systems for diesel fuel applications.

U.S. Pat. No. 4,690,688 issued to Adams et al. discloses a polysiloxane for use as a defoamer, wherein the polysiloxane is a copolymer with polyether side chains that provide at least 25 weight percent of the copolymer. However, these polysiloxane copolymers do not work well in wet diesel fuel because the ethers, as a hydrophilic material, will tend to stabilize the foaming of wet fuel. Additionally, to function properly these polysiloxanes must be present at levels in diesel fuel above those desirable in engine systems.

DE 4032006 describes a process for defoaming and/or degassing organic systems, including diesel oil, by adding a foam suppressant containing an organopolysiloxane with unsaturated sidechains. A disadvantage of this foam suppressant is that it contains high levels of silicon, which can be harmful to engines. In addition, it can be incompatible with some DAPs and does not age well.

U.S. Pat. No. 5,542,960 describes a class of organosilicone terpolymers which may be used to abate the foaming of diesel fuel. The terpolymers are prepared by grafting phenol derivative substituents and polyether substituents onto a polymethylsiloxane so that the final siloxane polymer includes dimethyldisiloxy, methylphenolicdisiloxy and methylpolyetherdisiloxy units thereon.

EP 741182 describes silicone diesel defoamers which include, on the polyorganosiloxane backbone, a mixture of methyl groups, unsaturated polyhydric groups, polyether groups and phenol groups.

WO 97/38067 describes a class of polydiorganosilioxane polymers useful as diesel fuel defoaming agents which have a certain content of saturated organic groups which include at least two hydroxyl groups or derivatives thereof.

Recent diesel fuel specifications have resulted in redesigned additive packages which have increased compatibility problems with silicone defoamers, thereby creating a need for further improvements in silicone defoaming efficiency.

SUMMARY OF THE INVENTION

The present invention provides a defoamer system for diesel fuel which comprises a novel, synergistic blend of silicone polymers and/or a silicone polymer having a novel blend of organic substituents thereon. The novel defoamer system provides excellent compatibility with additive packages, including recently introduced additive packages. The compatibility improvements are seen to be due to a very low silicone treat rate required using the inventive defoamer systems and to the fact that low to moderate molecular weight silicone backbones are employed, which are more soluble in the blend of additives.

In one respect, the invention is a defoamer composition for diesel fuel which comprises i) a mixture of Silicones A) and B) or ii) a Silicone C) wherein Silicone A is a polyhydric silicone of the formula:

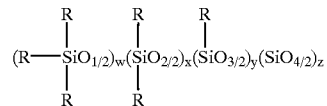

where the R groups are independently $R^1$, $R^2$, $R^3$, $R^4$ or $R^5$; $R^1$ is an aromatic or saturated aliphatic hydrocarbon group; $R^2$ is a polyhydric organic group; $R^3$ is a polyether group comprising about 50% or more ethylene oxide units and having a molecular weight of up to 1500; $R^4$ is an organic phenolic group; $R^5$ is a group as defined for $R^2$ except that the hydroxyl groups thereof have been reacted to form diester, diether, acetal or ketal groups; $w=2+y+2z$; $y=0-2$; $z=0-2$; $y+z=0-2$; $w+x+y+z=20-60$; the ratio $R^1/R^2$, corresponding to the number of $R^1$ groups divided by the number of $R^2$ groups, is 3–19; and the ratio $(R^3+R^4+R^5)/R^2$, corresponding to the total number of $R^3$, $R^4$ and $R^5$ groups divided by the number of $R^2$ groups, is 0–2, Silicone B is a polyether containing silicone of the formula:

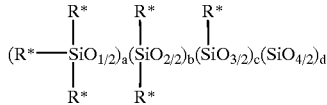

where the R* groups are independently $R^1$ or $R^3$; $R^1$ and $R^3$ are as previously defined; $a=2+c+2d$; $c=0-2$; $d=0-2$; $c+d=0-2$; $a+b+c+d=15-50$; and the ratio $R^1/R^3$, corresponding to the number of $R^1$ groups divided by the number of $R^3$ groups, is 3–19, Silicone C is a polyhydric/polyether/phenolic silicone of the formula:

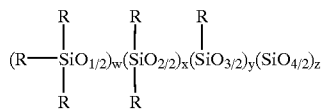

where the R groups, w, x, y, and z are as previously defined, provided that $R^2$ is a saturated polyhydric group and the ratios $R^3/R^2$ and $R^4/R^2$ are each numbers greater than 0.

In another respect, the invention is a diesel fuel formulation which comprises a silicone defoamer composition as described above.

In a still further respect the invention comprises novel polyhydric Silicone polymers C. In such polymers the R groups characteristically include members from each of $R^1$, $R^2$, $R^3$ and $R^4$.

DETAILED DESCRIPTION OF THE INVENTION

As used herein, the term "polyhydric organic group" refers to an organic group having two or more hydroxyl groups thereon. Preferred organic groups are saturated ether or saturated hydrocarbon groups. Polyhydric unsaturated aliphatic groups may be employed but are generally less preferred.

The Silicones A, B and C may suitably be produced from hydrido functional silicones using appropriate hydrosilation reactions to introduce the $R^2$, $R^3$ and $R^4$ groups, and if desired, to introduce variation in the $R^1$ groups.

The silicones used in the inventive defoamer compositions have a relatively low molecular size. Suitably the total number of siloxane repeat units is 20–60 for Silicones A and C, and 15–50 for Silicone B. Desirably no more than about 2 repeat units per molecule are trisiloxy or tetrasiloxy units.

In the definitions of Silicones A, B and C, given above, $R^1$ is an aromatic or saturated aliphatic hydrocarbon group. Specific examples include methyl, ethyl, propyl, octyl, decyl, dodecyl, stearyl, phenyl, methylphenyl, dimethylphenyl, phenylethyl, cyclohexyl, methylcyclohexyl, and the like. Preferred $R^1$ groups are alkyl, most suitably methyl, optionally with relatively minor amounts of $C_6$–$C_{22}$ alkyl groups. The longer alkyl groups may be introduced by hydrosilation of a corresponding $C_6$–$C_{22}$ olefin. For instance a polydimethylsiloxane having a specific content of methylhydrogendisiloxy and/or dimethylhydrogensiloxy units thereon can be used to hydrosilate a higher olefin such as decene to produce a desired content of decyl groups grafted onto the polymer molecule. In preparing the silicone copolymers used in the invention, such hydrosilations may be desirable to consume any excess silicon hydride functionality in the starting hydrido silicone polymer over that needed to introduce the respective $R^2$, $R^3$ and/or $R^4$ groups onto the molecule. Long chain alkyl groups can also be introduced to modify solubility or the hydrophilic/hydrophobic balance properties.

The polyhydric organic groups $R^2$ which are present in Silicones A and C may be aliphatic, low molecular weight hydrocarbon groups, optionally interrupted with an ether oxygen atom and having at least two hydroxy groups thereon. The $R^2$ group preferably has a molecular weight between about 134 and about 644, and more preferably between about 134 and about 400. The $R^2$ group preferably is saturated completely, as disclosed in WO 97/38067, although unsaturated polyhydric groups such as disclosed in DE 4032006 also show a synergistic improvement in defoaming performance when blended with a Silicone B in accordance with the present invention. The $R^2$ group may be provided on the molecule by a hydrosilation grafting reaction wherein a silicone polymer having a content of silicon hydride groups, typically present as methylhydrogendisiloxy and/or dimethylhydrogensiloxy repeat units, can be used to hydrosilate an unsaturated hydrocarbon group on a polyhydric compound having an unsaturated site such as an allyl, methallyl or vinyl group.

Examples of compounds which may be hydrosilated in this manner to form $R^2$ groups include trimethylolpropane monoallyl ether (TMPMAE), ethoxylated pentaerythritol allyl ether, propoxylated pentaerythritol allyl ether, tri-isopropanolamine allyl ether, ethoxylated allyl sorbitol or 1,3-allyloxypropanediol. Polyhydric compounds having acetylenic unsaturation, such as 2-butyne-1,4-diol, may be employed to provide polyhydric groups for the Silicone A, but are less preferred than olefinically unsaturated polyhydric compounds. In the case of Silicone C, the polyhydric group should be saturated and therefore an olefinically unsaturated polyhydric compound should be used. TMPMAE is preferred.

The $R^3$ groups are polyether groups comprising 50% or more by weight ethylene oxide (excluding starting and terminal groups) and having a molecular weight of up to about 1500. They may be provided on a silicone backbone by a hydrosilation grafting reaction using a silicon hydride functional silicone and a polyether having an olefinically unsaturated end group, such as an allyl group. Preferred polyether groups are derived from allyl started polyethylene oxides or polyethylene oxide/polypropylene oxide polyethers having a molecular weight of about 100 to about 350. Also preferably the ethylene oxide content of the polyether is at least 75% by weight, most preferably 100%. The polyether group may suitably be terminated with a hydroxy, alkoxy or acetoxy group.

The $R^4$ groups are suitably derived from phenol compounds having unsaturated olefinic or acetylenic group thereon. A similar hydrosilation reaction as those described above may be used. A typical example of a phenol compound which may be grafted to a silicone polymer in this manner is eugenol (i.e. 4-allyl-2-methoxyphenol). Other phenol compounds which may be employed include vinylphenol, vinyl guaiacol and 4-allylphenol. In Silicone C, the phenolic $R^4$ groups are advantageously present, relative to the polyhydric $R^2$ groups, in a ratio of from about 0.05 to about 0.7, desirably about 0.1 to about 0.4.

In silicone C, polyether $R^3$ groups are advantageously present relative to the polyhydric $R^2$ groups, in a ratio $(R^3/R^2)$ of from about 0.25 to about 5.

An unsaturated alcohol or polyol can be reacted to form esters, ethers, acetals or ketals in accordance with well known reactions and derivative thereof hydrosilated in like manner to form groups $R^5$, if desired. For instance an unsaturated diol can be transformed into a corresponding cyclic formal via reaction with formaldehyde, and the resulting cyclic olefins can be grafted onto the siloxane backbone by hydrosilation. Alternatively a polyorganosiloxane having polyhydric groups $R^2$ may have a selected portion of the polyhydric groups converted into diester, diether, acetal or ketal derivatives using such well known reactions in order to fine tune the solubility parameters of the Silicone A or C.

Silicones A or C having $R^3$, $R^4$ and/or $R^5$ groups, in addition to $R^1$ and $R^2$ groups, may be prepared by hydrosilation of a mixture of unsaturated polyhydric compounds with unsaturated polyether and/or unsaturated phenol compounds. A sequential hydrosilation process in which the different unsaturated compounds are sequentially added to silicone having an excess of SiH groups, relative to each of the unsaturated compounds individually, may also be employed.

An example of a polyhydric silicone within the definition of Silicone A is provided in Example 2 of WO 97/38067. An example of a polyether silicone within the definition of Silicone B is provided, for instance, in U.S. Pat. No. 3,507,815. Silicones C are novel.

During manufacture, it is often advantageous to add a solvent to ensure that the reactants are well mixed throughout the reaction. Solvents used for these purposes include DPG (dipropylene glycol), toluene and any other solvent of which has suitable solubility characteristics, such as 2-ethyl hexanol, isopropanol, various aromatic solvents such as Solwesso 150, aliphatic ester alcohols such as Texanol (2,2,4-trimethyl-1,3-pentanediol monoisobutyrate), isophorone, mixtures of same, and the like. With the copolymers of the invention, it is not necessary to remove the solvent in order that the copolymers be effective as defoamers. However, for the sake of safe transportation, volatile solvents such as toluene and isopropanol can optionally be removed. Non-volatile solvents or those of a high flash point (e.g., DPG and ethylhexanol) do not pose the same safety problems, and there is no need to remove them.

The blended Silicones A and B are suitably employed in the defoamer composition at a weight ratio of A/B of from about 0.1 to about 10, preferably from about 0.2 to about 5, and more preferably from about 0.5 to about 3.

In diesel fuel formulations the silicones A and B, or C are desirably employed in an amount which provides a total weight of silicone of about 15 ppm or less, preferably about 8 ppm or less and more preferably about 5 ppm or less.

Use of the Copolymers

For defoamers, the modified polysiloxane is typically blended with a DAP and added to the petroleum product at a refinery. Proprietary DAPs are available from a number of commercial sources.

The silicone defoamers of the invention should be added to the diesel fuel in an amount totaling about 15 ppm or less, preferably less than 10 ppm and more preferably about 3 ppm or less, based on total silicone content. Preferably, a minimum amount of polysiloxane copolymer is used.

The silicones A and B, or C, may also be blended with other silicone defoamers, with silicone oil, and/or with silica to provide defoamer formulations.

The invention is illustrated by the following non-limiting examples.

EXAMPLES

Diesel Antifoam Performance

The performance of defoamer is assessed in terms of either the foam volume obtained by injecting 100 cc of a fuel formulation to a graduated cylinder and observing initial foam volume and relative collapse time of the foam compared to a blank. Details of this procedure are described in U.S. Pat. No. 5,542,960, incorporated herein by reference. Lower foam heights and/or lower collapse times indicate a more efficient defoamer.

In the following examples the following abbreviations are used:

| Siloxane Units: | |
| --- | --- |
| M | trimethylsiloxy |
| D | dimethyldisiloxy |
| D' | methylhydrogendisiloxy |

| Polyhydric Silicone A: | |
| --- | --- |
| A-1 | Hydrosilation reaction product of SiH silicone, MD44D'11M, and trimethylolpropane monallyl ether. |
| A-2 | Hydrosilation reaction product of SiH silicone, MD16D'4M, and trimethylolpropane monallyl ether. |
| A-3 | Hydrosilation reaction product of SiH silicone, MD24D'6M, and trimethylolpropane monallyl ether. |
| A-4 | Hydrosilation reaction product of SiH silicone, MD42D'7M, and trimethylolpropane monallyl ether. |
| A-5 | Hydrosilation reaction product of SiH silicone, MD42D'7M, and 40/60 molar blend of an allyl started, methyl capped, polyether with a statistical 8 moles of ethylene oxide, and trimethylolpropane monoallyl ether. |
| A-6 | Hydrosilation reaction product of SiH silicone, MD44D'11M, and 2-butyne-1,4-diol. |
| A-7 | Hydrosilation reaction product of SiH silicone, MD44D'11M, and 60/40 molar blend of TMPAE and eugenol. |
| A-8 | Hydrosilation reaction product of SiH silicone, MD43D'11.5M, and glycerine-1,4-allyl ether. |
| A-9 | Hydrosilation reaction product of SiH silicone, MD43D'11.5M, and 2-butyne-1,4-diol. |
| A-10 | Hydrosilation reaction product of SiH silicone, MD43D'11.5M, and 33/33/33 molar blend of 2-butyne-1,4-diol, eugenol and an allyl started, methyl capped, polyether with a statistical 8 moles of ethylene oxide. |
| A-11 | Hydrosilation reaction product of SiH silicone, MD43'11.5M, and 33/33/33 molar blend of 2-butyne-1,4-diol, eugenol and 1-decene. |

| Polyether Silicone B: | |
| --- | --- |
| B-1 | Hydrosilation reaction product of SiH silicone, MD43D'11.5M, and an allyl started, hydroxy terminated, 750 MW EO/PO polyether 75 weight percent EO. |
| B-2 | Hydrosilation reaction product of SiH silicone, MD42D'7M, and an allyl started, hydroxy terminated, 750 MW EO/PO polyether 75 weight percent EO. |
| B-3 | Hydrosilation reaction product of SiH silicone, MD13D'4.5M, and an allyl started, hydroxy terminated, 550 MW polyethleneoxide. |
| B-4 | Hydrosilation reaction product of SiH silicone, MD42D'7M, and an allyl started, methyl capped, 1500 MW EO/PO polyether 75 weight percent EO. |
| B-5 | Hydrosilation reaction product of SiH silicone, MD13D'4.5M, and an allyl started, hydroxy terminated, 350 MW polyethyleneoxide. |

| Polyhydric/polyether/phenolic Silicone C: | |
| --- | --- |
| C-1 | Hydrosilation reaction product of SiH silicone, MD44D'11M, and 30/60/10 molar blend of an allyl started, methyl capped, polyether with a statistical 8 moles of ethylene oxide, trimethylolpropane monoallyl ether and eugenol. |
| C-2 | Hydrosilation reaction product of SiH silicone, MD44D'11M, and 20/60/20 molar blend of an allyl started, methyl capped, polyether with a statistical 8 moles of ethylene oxide, trimethylolpropane monoallyl ether and eugenol. |

Several diesel fuel/DAP blends were tested in the manner indicated above using the silicone defoaming additives shown in Tables 1 or 2, where the samples identified by letter series designation are comparative examples and those identified by number designation are invention examples. Proprietary DAP packages of different manufacturers are indicated by the designations DAP-01, DAP-02, DAP-17 and DAP-FB, respectively. These DAPs were known to have different compatibility profiles with prior art silicone defoamers. Silicones A and C were added as 25–50% active component in dipropylene glycol or 2-ethylhexanol, with the indicated quantities determined on the basis of the active component.

TABLE 1

| Example | Polyhydric SILICONE A Structure | (ppm) | Polyether SILICONE B Structure | (ppm) | Wt. Ratio A/B | Total Silicone (ppm) | Foam Volume (ml) | Defoam Time (sec) |
|---|---|---|---|---|---|---|---|---|
| DIESEL D0097, 700 ppm DAP-17 | | | | | | | | |
| A | — | — | — | — | — | — | 135 | 35 |
| B | A-1 | 1.88 | — | — | — | 1.88 | 60 | 10 |
| C | A-1 | 3.75 | — | — | — | 3.75 | 5 | 4 |
| D | — | | B-2 | 15 | — | 15 | 33 | 11 |
| E | — | | B-3 | 15 | — | 15 | 40 | 9 |
| 1 | A-1 | 2.5 | B-2 | 5 | 0.5 | 7.5 | 33 | 7 |
| 2 | A-1 | 2.5 | B-3 | 5 | 0.5 | 7.5 | 1 | 1 |
| 3 | A-1 | 1.67 | B-3 | 3.33 | 0.5 | 5 | 2 | 3 |
| 4 | A-1 | 2 | B-3 | 2 | 1 | 4 | 5 | 4 |
| 5 | A-1 | 1.67 | B-4 | 3.33 | 0.5 | 5 | 40 | 7 |
| 6 | A-1 | 1.67 | B-1 | 3.33 | 0.5 | 5 | 1 | 1 |
| 7 | A-1 | 1.67 | B-5 | 3.33 | 0.5 | 5 | 1 | 1 |
| 8 | A-1 | 2.5 | B-3 | 5 | 0.5 | 7.5 | 1 | 1 |
| 9 | A-1 | 3 | B-3 | 3 | 1 | 6 | 1 | 1 |
| 10 | A-1 | 2.5 | B-4 | 5 | 0.5 | 7.5 | 10 | 5 |
| 11 | A-1 | 2.5 | B-1 | 5 | 0.5 | 7.5 | 1 | 1 |
| 12 | A-1 | 2.5 | B-5 | 5 | 0.5 | 7.5 | 1 | 1 |
| 13 | A-1 | 0.83 | B-5 | 1.67 | 0.5 | 2.5 | 10 | 4 |
| 14 | A-1 | 1.25 | B-5 | 2.5 | 0.5 | 3.75 | 2 | 2 |
| 15 | A-1 | 1 | B-5 | 1 | 1 | 2 | 13 | 5 |
| 16 | A-1 | 1.5 | B-5 | 1.5 | 1 | 3 | 3 | 2 |
| 17 | A-1 | 0.83 | B-1 | 1.67 | 0.5 | 2.5 | 30 | 6 |
| 18 | A-1 | 1.25 | B-1 | 2.5 | 0.5 | 3.75 | 3 | 4 |
| 19 | A-1 | 1 | B-1 | 1 | 1 | 2 | 10 | 4 |
| 20 | A-1 | 1.5 | B-1 | 1.5 | 1 | 3 | 2 | 3 |
| 21 | A-1 | 1.04 | B-1 | 0.83 | 1.25 | 1.87 | 20 | 5 |
| 22 | A-1 | 1.56 | B-1 | 1.25 | 1.25 | 2.81 | 3 | 2 |
| DIESEL CEC: 700 ppm DAP-01 | | | | | | | | |
| F | — | — | — | — | — | 0 | 130 | 35 |
| G | — | — | B-1 | 15 | — | 15 | 37 | 9 |
| H | A-1 | 1.25 | — | — | — | 1.25 | 120 | 14 |
| I | A-1 | 1.88 | — | — | — | 1.88 | 87 | 11 |
| J | A-1 | 3.75 | — | — | — | 3.75 | 33 | 12 |
| 23 | A-1 | 1 | B-1 | 1 | 1 | 2 | 13 | 8 |
| K | A-2 | 2.5 | — | — | — | 2.5 | 107 | 11 |
| L | A-2 | 7.5 | — | — | — | 7.5 | 77 | 9 |
| 24 | A-2 | 2 | B-1 | 1 | 2 | 3 | 110 | 10 |
| M | A-3 | 2.5 | — | — | — | 2.5 | 67 | 11 |
| N | A-3 | 7.5 | — | — | — | 7.5 | 10 | 8 |
| 25 | A-3 | 2 | B-1 | 1 | 2 | 3 | 5 | 5 |
| O | A-4 | 2.5 | — | — | — | 2.5 | 87 | 20 |
| P | A-4 | 7.5 | — | — | — | 7.5 | 60 | 15 |
| 26 | A-4 | 2 | B-1 | 1 | 2 | 3 | 10 | 4 |
| Q | A-5 | 2.5 | — | — | — | 2.5 | 100 | 14 |
| R | A-5 | 7.5 | — | — | — | 7.5 | 80 | 16 |
| 28 | A-5 | 2 | B-1 | 1 | 2 | 3 | 80 | 12 |
| S | A-6 | 2.5 | — | — | — | 2.5 | 110 | 15 |
| T | A-6 | 7.5 | — | — | — | 7.5 | 100 | 15 |
| 29 | A-6 | 2 | B-1 | 1 | 2 | 3 | 60 | 18 |
| U | A-7 | 2.5 | — | — | — | 2.5 | 130 | 16 |
| 30 | A-7 | 2 | B-1 | 2 | 1 | 4 | 70 | 8 |
| V | — | — | — | — | — | 0 | 130 | 39 |
| W | A-8 | 2.5 | — | — | — | 2.5 | 120 | 21 |
| X | A-8 | 7.5 | — | — | — | 7.5 | 67 | 13 |
| 31 | A-8 | 2 | B-1 | 1 | 2 | 3 | 120 | 17 |
| Y | — | — | — | — | — | 0 | 130 | 42 |
| 32 | A-1 | 1 | B-1 | 1 | 1 | 2 | 37 | 9 |
| 33 | A-1 | 1.5 | B-1 | 1.5 | 1 | 3 | 10 | 9 |
| 34 | A-1 | 1 | B-1 | 1 | 1 | 2 | 40 | 9 |
| 35 | A-1 | 1.5 | B-1 | 1.5 | 1 | 3 | 10 | 11 |

TABLE 1-continued

| Example | Polyhydric SILICONE A Structure | (ppm) | Polyether SILICONE B Structure | (ppm) | Wt. Ratio A/B | Total Silicone (ppm) | Foam Volume (ml) | Defoam Time (sec) |
|---|---|---|---|---|---|---|---|---|
| 36 | A-1 | 1 | B-1 | 1 | 1 | 2 | 40 | 10 |
| 37 | A-1 | 1 | B-1 | 1 | 1 | 2 | 40 | 10 |
| 38 | A-1 | 1 | B-1 | 1 | 1 | 2 | 40 | 9 |
| 39 | A-1 | 1 | B-1 | 1 | 1 | 2 | 40 | 9 |
| 40 | A-1 | 1 | B-1 | 1 | 1 | 2 | 40 | 9 |
| 41 | A-1 | 1.5 | B-1 | 1.5 | 1 | 3 | 10 | 9 |
| Z | — | — | — | — | — | 0 | 130 | 33 |
| AA | A-9 | 1.25 | — | — | — | 1.25 | 123 | 19 |
| AB | A-10 | 1.25 | — | — | — | 1.25 | 140 | 27 |
| AC | A-11 | 1.25 | — | — | — | 1.25 | 130 | 94 |
| 42 | A-9 | 1 | B-1 | 1 | 1 | 2 | 90 | 12 |
| 43 | A-10 | 1 | B-1 | 1 | 1 | 2 | 103 | 13 |
| 44 | A-11 | 1 | B-1 | 1 | 1 | 2 | 127 | 21 |
| | | | DIESEL CEC, 700 ppm DAP-02 | | | | | |
| AD | — | — | — | — | — | 0 | 132 | 36 |
| AE | — | — | B-1 | 15 | — | 15 | 20 | 7 |
| AF | A-1 | 1.25 | — | — | — | 1.25 | 100 | 11 |
| AG | A-1 | 1.88 | — | — | — | 1.88 | 67 | 9 |
| AH | A-1 | 3.75 | — | — | — | 3.75 | 10 | 8 |
| 45 | A-1 | 1 | B-1 | 1 | 1 | 2 | 5 | 6 |
| 46 | A-1 | 1.5 | B-1 | 1.5 | 1 | 3 | 2 | 3 |
| | | | DIESEL CEC, 700 ppm DAP-17 | | | | | |
| AI | — | — | — | — | — | 0 | 135 | 36 |
| AJ | — | — | B-1 | 15 | — | 15 | 20 | 7 |
| AK | A-1 | 1.25 | — | — | — | 1.25 | 100 | 12 |
| AL | A-1 | 1.88 | — | — | — | 1.88 | 22 | 10 |
| AM | A-1 | 3.75 | — | — | — | 15 | 5 | 4 |
| 47 | A-1 | 1 | B-1 | 1 | 1 | 2 | 5 | 5 |
| 48 | A-1 | 1.5 | B-1 | 1.5 | 1 | 3 | 2 | 3 |
| | | | DIESEL CEC, 470 ppm DAP-FB | | | | | |
| AN | — | — | — | — | — | 0 | 130 | 37 |
| AO | A-1 | 3.75 | — | — | — | 3.75 | 8 | 11 |
| AP | — | — | B-1 | 15 | — | 15 | 40 | 6 |
| 49 | A-1 | 1 | B-1 | 1 | 1 | 2 | 10 | 8 |
| 50 | A-1 | 1.5 | B-1 | 1.5 | 1 | 3 | 5 | 7 |
| | | | DIESEL D0997, 700 ppm DAP-17 | | | | | |
| AQ | — | — | — | — | — | 0 | 135 | 35 |
| AR | A-1 | 1.88 | — | — | — | 1.88 | 60 | 10 |
| AS | A-1 | 3.75 | — | — | — | 3.75 | 5 | 4 |
| AT | — | — | B-2 | 15 | — | 15 | 33 | 11 |
| AU | — | — | B-3 | 15 | — | 15 | 40 | 9 |
| 51 | A-1 | 2.5 | B-2 | 5 | 0.5 | 7.5 | 33 | 7 |
| 52 | A-1 | 2.5 | B-3 | 5 | 0.5 | 7.5 | 1 | 1 |
| 53 | A-1 | 1.68 | B-3 | 3.34 | 0.5 | 5 | 2 | 3 |
| 54 | A-1 | 2 | B-3 | 10 | 0.2 | 12 | 5 | 4 |
| 55 | A-1 | 1.68 | B-4 | 3.34 | 0.5 | 5 | 40 | 7 |
| 56 | A-1 | 1.68 | B-1 | 3.34 | 0.5 | 5 | 1 | 1 |
| 57 | A-1 | 1.68 | B-5 | 3.34 | 0.5 | 5 | 1 | 1 |
| 58 | A-1 | 1.68 | B-3 | 3.34 | 0.5 | 5 | 1 | 1 |
| 59 | A-1 | 3 | B-3 | 3 | 1 | 6 | 1 | 1 |
| 60 | A-1 | 2.5 | B-4 | 5 | 0.5 | 7.5 | 10 | 5 |
| 61 | A-1 | 2.5 | B-1 | 5 | 0.5 | 7.5 | 1 | 1 |
| 62 | A-1 | 2.5 | B-5 | 5 | 0.5 | 7.5 | 1 | 1 |
| 63 | A-1 | 0.83 | B-5 | 1.66 | 0.5 | 2.5 | 10 | 4 |
| 64 | A-1 | 1.25 | B-5 | 2.5 | 0.5 | 3.75 | 2 | 2 |
| 65 | A-1 | 0.83 | B-5 | 1.66 | 0.5 | 2.5 | 13 | 5 |
| 66 | A-1 | 1.25 | B-5 | 2.5 | 0.5 | 3.75 | 3 | 2 |
| 67 | A-1 | 0.83 | B-1 | 1.66 | 0.5 | 2.5 | 30 | 6 |
| 68 | A-1 | 1.25 | B-1 | 2.5 | 0.5 | 3.75 | 3 | 4 |
| 69 | A-1 | 1 | B-1 | 1 | 1 | 2 | 10 | 4 |
| 70 | A-1 | 1.5 | B-1 | 1.5 | 1 | 3 | 2 | 3 |
| 71 | A-1 | 1.04 | B-1 | 0.83 | 1.25 | 1.87 | 20 | 5 |
| 72 | A-1 | 1.56 | B-1 | 1.25 | 1.25 | 2.81 | 3 | 2 |

It can be seen from Table I that the blends of polyhydric Silicone A and polyether Silicone B typically gave lower foam volume and/or faster defoam time than e expected from a simple additive effect of the silicones employed. This tic effect is unexpected and provides remarkably superior results in most cases.

Use of Silicone C is illustrated in the formulations shown in Table 2.

TABLE 2

| Example | Polyhydric/ polyether/phenol SILICONE C Structure | Polyhydric/ polyether/phenol SILICONE C (ppm) | Polyether SILICONE B Structure | Polyether SILICONE B (ppm) | Wt. Ratio A/B | Total Silicone (ppm) | Foam Volume (ml) | Defoam Time (sec) |
|---|---|---|---|---|---|---|---|---|
| | | | DIESEL CEC, 700 ppm DAP-01 | | | | | |
| 73 | C-1 | 2.5 | — | — | — | 2.5 | 5 | 6 |
| 74 | C-1 | 7.5 | — | — | — | 7.5 | 5 | 5 |
| 75 | C-2 | 2.5 | — | — | — | 2.5 | 5 | 7 |
| 76 | C-2 | 7.5 | — | — | — | 7.5 | 2 | 6 |
| 77 | C-1 | 2 | B-1 | 1 | 2 | 3 | 2 | 2 |

With respect to the novel polymers C-1 and C-2 it can be seen that these polymers, which contain saturated aliphatic polyhydric, polyether and phenol groups in a single molecule, give results, even when used without a polyether Silicone B which are remarkably superior to all of the other polyhydric silicones tested, including polymer A-5 which has both polyether and saturated aliphatic polyhydric functionality, and A-10 which has unsaturated aliphatic polyhydric, polyether and phenol functionality in a single molecule. Moreover a further synergistic effect is shown when Silicone C-1 is blended with Silicone B-1.

All published documents, including all U.S. patent documents, mentioned anywhere in this application are hereby expressly incorporated herein by reference in their entirety. Any copending patent applications, mentioned anywhere in this application are also hereby expressly incorporated herein by reference in their entirety.

What is claimed is:

1. A diesel fuel defoamer composition comprising:

i) a mixture of Silicones A) and B) or ii) a Silicone C)

wherein Silicone A is a polyhydric silicone of the formula:

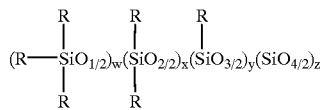

where the R groups are independently $R^1$, $R^2$, $R^3$, $R^4$ or $R^5$; $R^1$ is an aromatic or saturated aliphatic hydrocarbon group; $R^2$ is a polyhydric organic group; $R^3$ is a polyether group comprising about 50% or more ethylene oxide units and having a molecular weight of up to 1500; $R^4$ is an organic phenolic group; $R^5$ is a group as defined for $R^2$ except that the hydroxyl groups thereof have been reacted to form diester, diether, acetal or ketal groups; w=2+y+2z; y=0–2; z=0–2; y+z=0–2; w+x+y+z=20–60; the ratio $R^1/R^2$, corresponding to the number of $R^1$ groups divided by the number of $R^2$ groups, is 3–19; and the ratio $(R^3+R^4+R^5)/R^2$, corresponding to the total number of $R^3$, $R^4$ and $R^5$ groups divided by the number of $R^2$ groups, is 0–2, Silicone B is a polyether containing silicone of the formula:

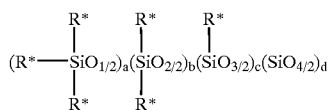

where the $R^*$ groups are independently $R^1$ or $R^3$; $R^1$ and $R^3$ are as previously defined; a=2+c+2d; c=0–2; d=0–2; c+d= 0–2; a+b+c+d=15–50; and the ration $R^1/R^3$, corresponding to the number of $R^1$ groups divided by the number of $R^3$ groups, is 3–19, Silicone C is a polyhydric/polyether/phenolic silicone of the formula:

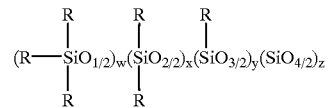

where the R groups, w, x, y, and z are as previously defined, provided that $R^2$ is a saturated polyhydric group; the ratio $R^3/R^2$, corresponding to the number of $R^3$ groups divided by the number of $R^2$ groups, is a number greater than 0; and the ratio $R^4/R^2$, corresponding to the number of $R^4$ groups divided by the number of $R^2$ groups, is a number greater than 0.

2. A composition as in claim 1 wherein $R^1$ is alkyl.

3. A composition as in claim 1 wherein the Silicones A and B are present at a weight ratio of A/B of from about 0.1 to about 10.

4. A composition as in claim 1 wherein $R^2$ is an organo group produced by hydrosilation of a polyhydric compound selected from the group consisting of trimethylolpropane monoallyl ether, ethoxylated pentaerythritol allyl ether, propoxylated pentaerythritol allyl ether, tri-isopropanolamine allyl ether, ethoxylated allyl sorbitol, 1,3-allyloxypropanediol and 2-butyne-1,4-diol.

5. A composition as in claim 1 wherein $R^2$ is a saturated hydrocarbon group having a plurality of hydroxyl groups thereon optionally interrupted with an ether oxygen atom.

6. A composition as in claim 1 wherein $R^1$ is methyl, the Silicones A and B are present at a weight ratio of A/B of from about 0.5 to about 3, the $R^2$ groups comprise (2,2-dihydroxymethylbutoxy)propyl groups, and in Silicone B the $R^3$ groups comprise at least 75% ethylene oxide units.

7. A composition as in claim 1 wherein $R^3$ is a group produced by hydrosilation of a polyether compound having an olefinic or acetylenic terminal group, wherein about 50% or more of the non-terminal repeat units of the polyether compound are ethylene oxide units.

8. A composition as in claim 7 wherein at least 75% or more of the non-terminal repeat units of the polyether compound are ethylene oxide units.

9. A composition as in claim 1 wherein $R^4$ is a group produced by hydrosilation of a phenol compound selected from the group consisting of eugenol, vinyl phenol, vinyl guaiacol and allyl phenol.

10. A diesel fuel formulation which comprises a diesel fuel and a defoamer composition as in claim 1.

11. A diesel fuel formulation as in claim 10 wherein the total weight basis concentration of silicones in said fuel formulation about 15 ppm or less.

12. A diesel fuel formulation as in claim 10 wherein $R^2$ is an organo group produced by hydrosilation of a polyhydric compound selected from the group consisting of trimethylolpropane monoallyl ether, ethoxylated pentaerythritol allyl ether, propoxylated pentaerythritol allyl ether, triisopropanolamine allyl ether, ethoxylated allyl sorbitol, 1,3-allyloxypropanediol and 2-butyne-1,4-diol.

13. A diesel fuel formulation as in claim 10 wherein the Silicones A and B are present at a weight ratio of A/B of from about 0.5 to about 3, the $R^2$ groups comprise (2,2-dihydroxymethyl)butoxypropyl groups, and in Silicone B the $R^3$ groups comprise at least 75% ethylene oxide units.

14. A diesel fuel formulation as in claim 10 comprising said Silicone C.

15. A diesel fuel formulation as in claim 14 wherein said ratio $R^3/R^2$ is from about 0.25 to about 5 and said ratio $R^4/R^2$ is from about 0.05 to about 0.7.

16. A polyhydric/polyether/phenolic silicone of the formula:

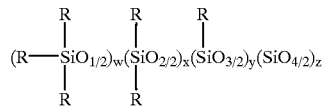

where the R groups are independently $R^1$, $R^2$, $R^3$, $R^4$ or $R^5$; $R^1$ is an aromatic or saturated aliphatic hydrocarbon group; $R^2$ is a polyhydric organic group; $R^3$ is a polyether group comprising about 50% or more ethylene oxide units and having a molecular weight of up to 1500; $R^4$ is an organic phenolic group; $R^5$ is a group as defined for $R^2$ except that the hydroxyl groups thereof have been reacted to form diester, diether, acetal or ketal groups; w=2+y+2z; y=0–2; z=0–2; y+z=0–2; w+x+y+z=20–60; the ratio $R^1/R^2$, corresponding to the number of $R^1$ groups divided by the number of $R^2$ groups, is 3–19; the ratio $(R^3+R^4+R^5)/R^2$, corresponding to the total number of $R^3$, $R^4$ and $R^5$ groups divided by the number of $R^2$ groups, is a positive number of no more than about 2; the ratio $R^3/R^2$, corresponding to the number of $R^3$ groups divided by the number of $R^2$ groups, is a number greater than 0; and the ratio $R^4/R^2$, corresponding to the number of $R^4$ groups divided by the number of $R^2$ groups, is a number greater than 0.

17. A silicone as in claim 16 wherein said ratio $R^3/R^2$ is from about 0.25 to about 0.5.

18. A silicone as in claim 16 wherein said ratio $R^4/R^2$ is from about 0.05 to about 0.7.

19. A silicone as in claim 16 wherein the $R^4$ groups are (3-methoxy-4-hydroxy)phenylpropyl groups and the $R^2$ groups are (2,2-di-hydroxymethyl)butoxypropyl groups.

* * * * *